(12) United States Patent
Oliver et al.

(10) Patent No.: US 12,705,525 B2
(45) Date of Patent: Aug. 11, 2026

(54) SCALABLE CONTROL OF QUANTUM BITS USING BASEBAND PULSING

(71) Applicant: Massachusetts Institute of Technology, Cambridge, MA (US)

(72) Inventors: William D. Oliver, Lexington, MA (US); Simon Gustavsson, Cambridge, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 0 days.

(21) Appl. No.: 18/845,129

(22) PCT Filed: Feb. 8, 2023

(86) PCT No.: PCT/US2023/062180
§ 371 (c)(1),
(2) Date: Sep. 9, 2024

(87) PCT Pub. No.: WO2023/196707
PCT Pub. Date: Oct. 12, 2023

(65) Prior Publication Data

US 2025/0181955 A1 Jun. 5, 2025

Related U.S. Application Data

(60) Provisional application No. 63/328,880, filed on Apr. 8, 2022.

(51) Int. Cl.
*G06N 10/40* (2022.01)

(52) U.S. Cl.
CPC .................................... *G06N 10/40* (2022.01)

(58) Field of Classification Search
None
See application file for complete search history.

(56) References Cited

U.S. PATENT DOCUMENTS 5,287,057 A 2/1994 Gotoh
7,912,656 B2 3/2011 Berns et al.
(Continued)

FOREIGN PATENT DOCUMENTS

WO WO 2021/102321 96 5/2021

OTHER PUBLICATIONS

PCT International Search Report and Written Opinion dated Jun. 2, 2023, for International Application No. PCT/US 2023/062180; 11 Pages.

(Continued)

*Primary Examiner* — Thomas J. Hiltunen
(74) *Attorney, Agent, or Firm* — Daly, Crowley, Mofford & Durkee, LLP

(57) ABSTRACT

According to one aspect of the disclosure, a system for performing quantum computations includes: a first environment for being maintained at an ambient temperature, having a classical computing processor; and a second environment for being maintained at a cryogenic temperature, having a plurality of qubits and a multiplexing circuit coupled to the plurality of qubits, each of the plurality of qubits having a gap transition frequency; wherein the classical computing processor is configured to change the states of each of the plurality of qubits by controlling the multiplexing circuit to couple particular ones of the plurality of qubits to a pulsed baseband waveform.

19 Claims, 7 Drawing Sheets

(56) References Cited

U.S. PATENT DOCUMENTS

| | | | | |
|---|---|---|---|---|
| 10,658,424 | B2 | 5/2020 | Oliver et al. | |
| 10,804,115 | B2 * | 10/2020 | Kapusta | H01L 21/485 |
| 10,817,463 | B1 * | 10/2020 | DeBenedictis | H03K 17/92 |
| 10,938,346 | B2 * | 3/2021 | Berkley | H03B 15/003 |
| 11,949,439 | B2 * | 4/2024 | Phung | H04B 1/0028 |
| 11,983,602 | B1 * | 5/2024 | Field | G06F 1/206 |
| 12,373,167 | B2 * | 7/2025 | Swenson | H03H 11/36 |
| 2011/0065586 | A1 | 3/2011 | Maibaum et al. | |
| 2020/0274526 | A1 | 8/2020 | Cohen et al. | |
| 2020/0394548 | A1 * | 12/2020 | Das | H04L 7/033 |
| 2020/0395943 | A1 * | 12/2020 | Das | H03K 19/195 |
| 2021/0091062 | A1 | 3/2021 | Boothby | |
| 2024/0204885 | A1 * | 6/2024 | Lähteenmäki | G06N 10/00 |
| 2024/0405888 | A1 * | 12/2024 | Rudolph | G06N 10/40 |
| 2025/0005418 | A1 * | 1/2025 | Boothby | G06N 10/60 |
| 2025/0139478 | A1 * | 5/2025 | Li | G06N 10/40 |

OTHER PUBLICATIONS

Yoshikawa, "Superconducting Digital Electronics for Controlling Quantum Computing Systems", The Institute of Electronics, Information and Communication Engineers, vol. E102-C, No. 3, Mar. 2019, 7 Pages.

Boscain, "Time Minimal Trajectories for a Spin 1/2 Particle in a Magnetic Field", Preprint Sissa, Dec. 22, 2005. 31 Pages.

Avinadav et al., "Time-Optimal Universal Control of Two-Level Systems under Strong Driving" arXiv:1402.5467v2.4234v2, Jun. 9, 2014, 7 Pages.

Stehli, "Analog Quantum Simulator of the Multistate Landau-Zener Model", Dissertation by Alexander Denis Stehl approved by the KIT Department of Physics of the Karlsruhe Institute of Technology (KIT); Dec. 2, 2021, 132 Pages.

Martinis et al., "Fast Adiabatic Qubit Gates Using Only sigma-z Control" arXiv:1402.5467v2, Jul. 17, 2014, 10 Pages.

Zhang et al., "Universal Fast-Flux Control of a Coherent, Low-Frequency Qubit", American Physical Society, 2160-3308/21/11(1)/011010(13), Jan. 15, 2021, 13 Pages.

Campbell et al., "Universal Nonadiabatic Control of Small-Gap Superconducting Qubits", American Physical Society, 2160-3308/20-10(4)/041051(9), Dec. 14, 2020, 9 Pages.

Das et al. "Cryogenic Qubit Integration for Quantum Computing" 2018 IEEE 68th Electronic Components and Technology Conference, 2018, 11 Pages.

Rosenberg et al. "3D Integration and Packaging for Solid-State Qubits" arXiv:1906.11146v2, Jul. 24, 2019, 22 Pages.

Rosenberg et al. "3D Integrated Superconducting Qubits" Nature Partner Journals, Quantum Information, Oct. 2017, 5 Pages.

* cited by examiner

SCALABLE CONTROL OF QUANTUM BITS USING BASEBAND PULSING

CROSS-REFERENCE TO RELATED APPLICATIONS

This application is a U.S. National Stage Entry of International Application No. PCT/US2023/062180, filed on Feb. 8, 2023, which claims priority to, and the benefit under 35 U.S.C. § 119 of U.S. Provisional Patent Application No. 63/328,880 filed on Apr. 8, 2022, which is hereby incorporated by reference herein in its entirety.

STATEMENT REGARDING FEDERALLY SPONSORED RESEARCH

This invention was made with government support under FA8702-15-D-0001 awarded by the U.S. Air Force, and under W911NF-18-1-0116 awarded by the Army Research Office. The government has certain rights in the invention.

BACKGROUND

Quantum computing has revolutionary potential. There are classes of computational problems related to chemistry, medicine, optimization, and machine learning that are intractable to even the most powerful modern supercomputers, but which can be solved exponentially faster using quantum hardware. While there have been recent demonstrations of small-scale quantum computers, contemporary devices are restricted in their performance due to high error rates and limited prospects for scalability.

Various modalities may be used for quantum computing, including photonic, atomic, and solid-state systems. Solid-state qubits, such as those formed by an electron spin or a superconducting circuit, have transition frequencies in the GHz range. Because their frequencies are in this range, they are compatible with commercial-off-the-shelf (COTS) RF and microwave components. Solid-state qubits have the further advantage that they leverage decades of investment in fabrication by the semiconductor industry. Although convenient from the point of view of using COTS equipment, operation in the few-GHz range introduces the need for cooling the devices to avoid the qubit being inadvertently excited from "0" to "1" due to thermal effects.

The two primary types of superconducting qubits are the flux qubit and the charge qubit. With a charge qubit, the charging energy of its Josephson junctions dominates the coupling energy. In a Flux qubit, the situation is reversed, and the coupling energy dominates.

SUMMARY

Contemporary quantum hardware uses qubits with relatively high frequency $f_{01}$, typically around 5 GHZ, such that the corresponding energy is much larger than the equivalent kT thermal energy scale at dilution refrigerator temperatures around T=20 mK. Operating in this limit can ensure that thermally induced excited-state population is small. Control is then generally performed by resonant ($f_{01}$) microwave pulses.

Here, as illustrated in FIG. 1A, the rotation of a qubit's state 100 can be controlled by the amplitude of the applied microwave pulse 102. FIG. 1B shows an example of a circuit (e.g., a superconducting circuit that may be on a 2D or 3D chip) in which this technique may be used to control the state of a qubit. Illustrative circuit 120 includes a flux qubit 122 and a flux bias line 124 inductively coupled thereto by inductors 126. Flux qubit 122 can include a terminal 128 for coupling to readout circuitry (not shown). A microwave pulse can be applied to a flux bias line 124 and, by way of the inductive coupling, can cause the state of flux qubit 122 to rotate/change. More generally, and depending on qubit type and bias point, a microwave pulse can be applied to either a charge or a flux bias line, which will couple either capacitively or inductively.

While such techniques have successfully demonstrated error rates as low as 0.1%, the approach suffer from a number of shortcomings related to amplitude noise, control complexity, high thermal load, and high cost/qubit. In addition, the driver/control electronics are generally held at room temperature, and the signals are brought to the qubit via wiring, such as coaxial cables. Further, since conventional Rabi driving must be implemented at a rate much smaller than $f_{01}$ to avoid the impact of counter-rotating imperfections in the control, resonant driving of so-called "protected qubits" with small gaps becomes unreasonably slow and ameliorates their protected coherence advantage (the coherence times are longer, but so are the gate operations).

Contemporary quantum hardware uses one or more control and readout wires per qubit. In this "brute-force scaling era," the standard approach is to increase the numbers of qubits from 10 to 100 and even to 1000 using this approach of one or more control and readout wires per qubit. However, while this may be viewed as extensible, it is recognized here that is not scalable (other than by simple linear extension). The brute-force approach will ultimately be limited by the number of wires one can practically bring down to a chip or set of chips. One may contrast this with existing transistor chips, for which there are billions of transistors on the chip, yet only tens to hundreds of control wires coming to the chip.

There exist control technologies that operate at cryogenic temperatures, including cryogenic CMOS and single-flux quantum (SFQ) logic (a superconducting digital logic family). It is recognized here that these must be collocated with qubit chips at dilution refrigerator temperatures to leverage integration of the driver/control electronics with the qubit chips, in order to reduce the wire count. Maintaining cryogenic electronics at higher temperature stages is possible, but the run from that stage to the chip then requires a high wiring overhead. However, collocation of the cryogenic electronics presents a heating problem. If one takes the room temperature electronics and reproduces it at cryogenic temperatures, cryogenic CMOS would dissipate far too much power for today's or even envisioned future dilution refrigerators. Single-flux quantum (SFQ) schemes—although less energy per op than cryogenic CMOS—would also struggle to maintain sufficiently low power for convention control of conventional qubits. In both cases, it reduces to the activity factor—namely, how many times is a logic element switching and dissipating power when implementing a control pulse.

Described herein are structures and techniques for implementing single-qubit and two-qubit control using collocated electronics—either SFQ or cryogenic CMOS—that circumvents the problems listed above. It is applicable to both the "brute-force scaling era" as well as for an era of scalability. The techniques described here may be applied to any type of quantum computer where the qubit's longitudinal energy scale can be tuned by an external control parameter.

According to one aspect of the present disclosure, a system for performing quantum computations can include: a first environment for being maintained at an ambient temperature, having a classical computing processor; and a second environment for being maintained at a cryogenic temperature, having a plurality of qubits and a multiplexing circuit coupled to the plurality of qubits, each of the plurality of qubits having a gap transition frequency. The classical computing processor can be configured to change a state of each of the plurality of qubits by controlling the multiplexing circuit to couple particular ones of the plurality of qubits to a pulsed baseband waveform.

In some embodiments, the pulsed baseband waveform can include a non-adiabatic waveform that is not resonant with respect to the gap transition frequency of the particular ones of the plurality of qubits. In some embodiments, the multiplexing circuit may include a plurality of switches arranged in a binary tree structure. In some embodiments, the pulsed baseband waveform can include a first pulse having a first duration and a positive amplitude, and a second pulse having a second duration and a negative amplitude. In some embodiments, the first pulse, the second pulse, or both may be square pulses.

In some embodiments, the system can also include a driver circuit to generate the pulsed baseband waveform. In some embodiments, the driver circuit may be located within the first environment for being maintained at an ambient temperature. In some embodiments, the driver circuit may be located within the second environment for being maintained at a cryogenic temperature. In some embodiments, the driver circuit can be implemented using cryogenic CMOS or single-flux quantum (SFQ) logic.

In some embodiments, the multiplexer circuit can be located within the second environment for being maintained at a cryogenic temperature. In some embodiments, the multiplexer circuit can be implemented using cryogenic CMOS or single-flux quantum (SFQ) logic. In some embodiments, the multiplexer circuit may be collocated on the same chip as one or more of the plurality of qubits. In some embodiments, the multiplexer circuit can be bump bonded or wafer bonded to the plurality of qubits. In some embodiments, the multiplexer circuit may be connected to each of the plurality of qubits via chip-level interconnects.

According to another aspect of the present disclosure, a quantum computing system includes: a classical computing processor; a quantum processing unit (QPU) having a plurality of qubits; and means for controlling particular ones of the plurality of qubits to a pulsed baseband waveform responsive to commands received form the classical computing processor.

It is appreciated that the concepts, techniques, and structures disclosed herein may be embodied in other ways, and that the above summary of disclosed embodiments is thus meant to be illustrative rather than comprehensive or limiting. In particular, individual elements of different embodiments described herein may be combined to form other embodiments not specifically set forth above. Various elements, which are described in the context of a single embodiment, also may be provided in other embodiments separately, or in any suitable sub-combination. Moreover, other embodiments not specifically described herein also may be within the scope of the claims set forth below.

BRIEF DESCRIPTION OF THE DRAWINGS

The manner of making and using the disclosed subject matter may be appreciated by reference to the detailed description in connection with the drawings, in which like reference numerals identify like elements.

The drawings are not necessarily to scale, or inclusive of all elements of a system, emphasis instead generally being placed upon illustrating the concepts, structures, and techniques sought to be protected herein.

DETAILED DESCRIPTION

Embodiments of the present disclosure can provide qubit control using baseband pulsing. In more detail, single-qubit and two-qubit gates can be controlled using baseband pulses and nonadiabatic control. The control scheme relies on the size of the qubit avoided crossing and the timing of an approximately square baseband pulse applied to the qubit. Single qubit rotations and two-qubit gates may then be realized through "Landau-Zener interferometry" and quantum interference. While embodiments of the present disclosure are described in terms of superconducting qubit systems, the general concepts sought to be protected herein may also be applied to any type of system that features an avoided crossing, including but not limited to semiconducting qubit systems and naturally occurring atomic, molecular, or defect qubit systems. Avoided crossings may appear in single qubit systems and coupled qubit systems.

Figure 1A:
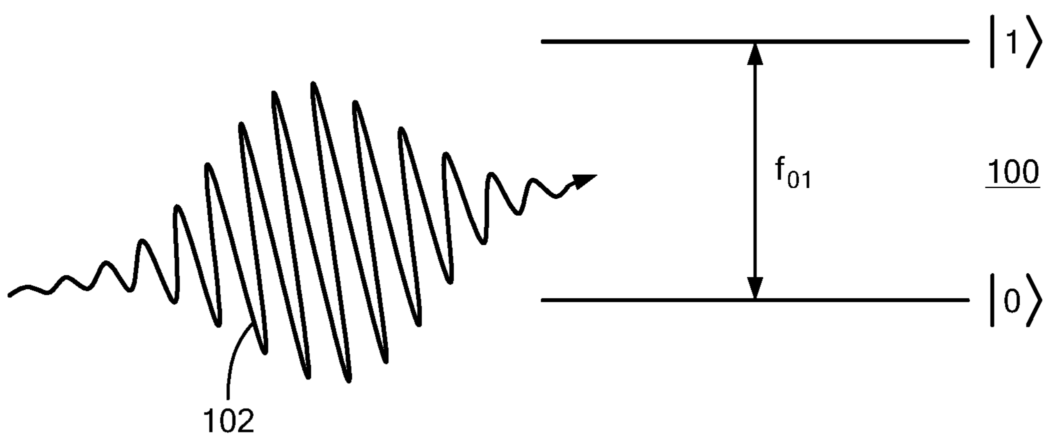
FIG. 1A illustrates qubit control using resonant microwave pulses.
Figure 1B:
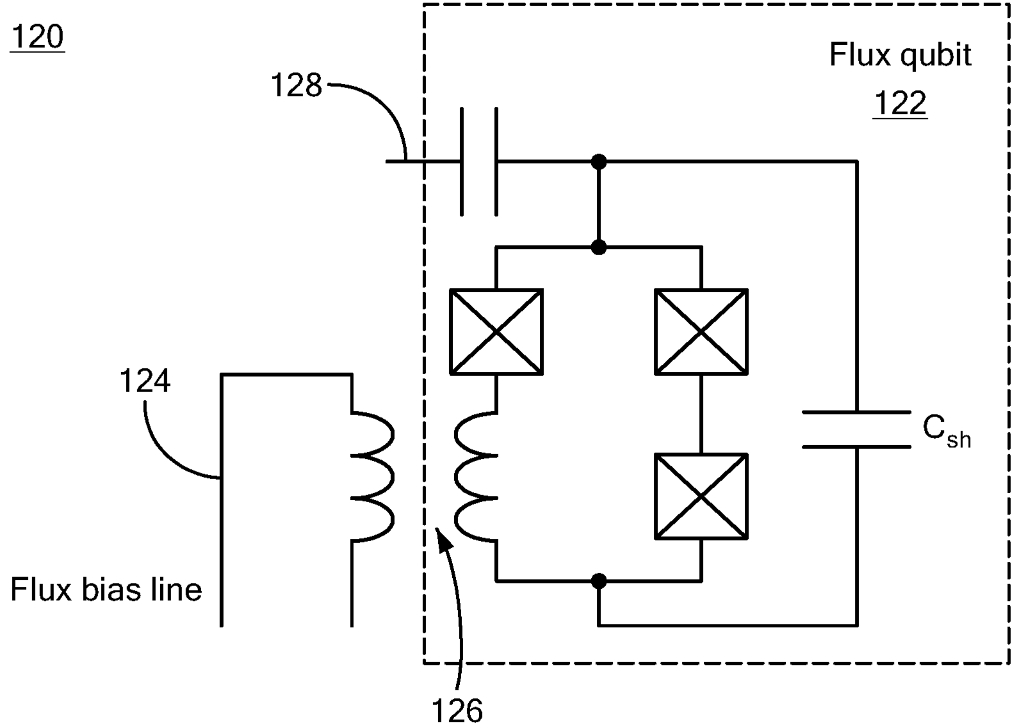
FIG. 1B is a circuit diagram showing a flux qubit with readout and control, the flux qubit being controllable using the technique of FIG. 1A.
Figure 2A:
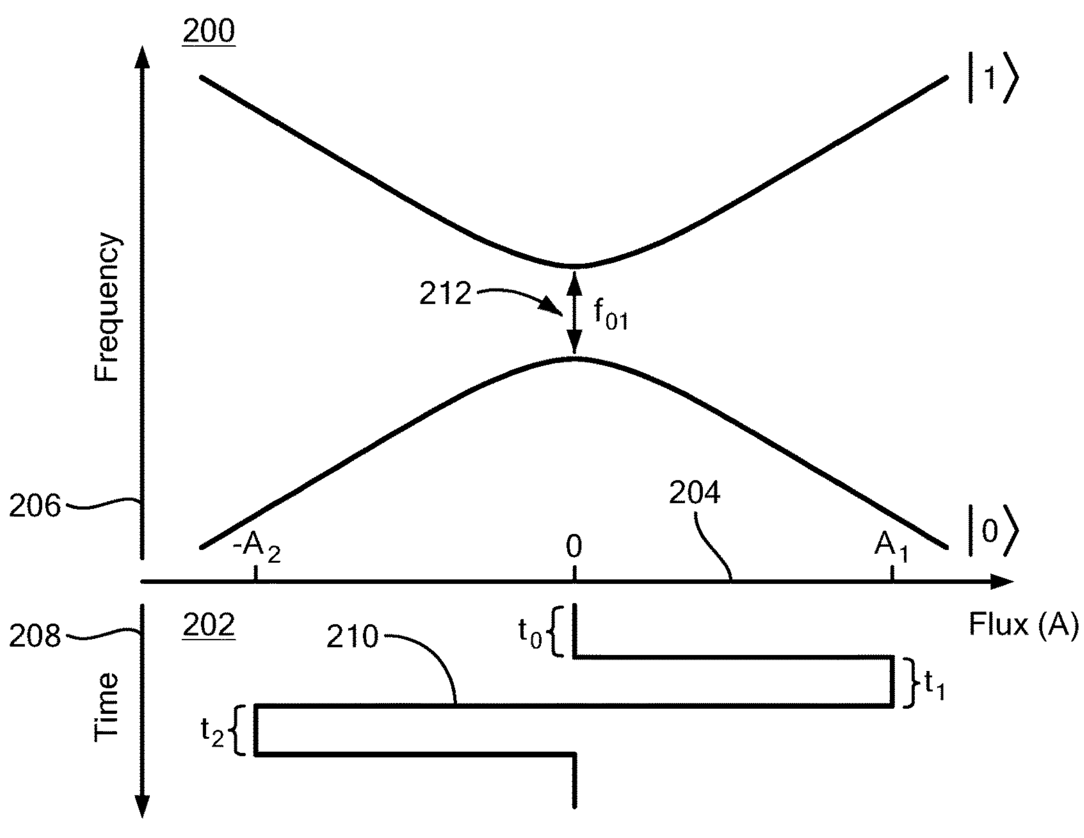
FIG. 2A shows a technique for controlling a flux qubit using baseband pulsing, according to embodiments of the present disclosure.

Referring to FIG. 2A, a first plot 200 illustrates a qubit avoided crossing, with horizontal axis 204 representing magnetic flux or current amplitude (A) and a vertical axis 206 representing qubit frequency or energy. A second plot 202 shares horizontal axis 204 and has a vertical axis 208 representing time.

To induce a transition between the qubit states (e.g., from |0⟩ to |1⟩ or vice versa), a waveform 210 having approximately square baseband pulses may be applied to a qubit (e.g., to a flux or charge superconducting qubit). The waveform 210 can include three segments, as shown in the figure and as follows. The first segment consists of waiting for a time $t_0$ at amplitude A=0, the idling point for the qubit. In the second segment, to initiate a gate operation, the amplitude is set to $A=A_1$ for a time $t_1$. In the third segment, to complete the gate, the amplitude is set to $A=-A_2$ for a time $t_2$. Finally, the waveform 210 is returned to the idling configuration with amplitude A=0.

The parameters $A_1$, $A_2$, $t_0$, $t_1$, and $t_2$ can be selected to define arbitrary rotations of the single- or two-qubit state. For the scheme to work, the slew rate of the amplitude A between the three segments must be faster than $1/f_{01}$, which is the minimum frequency gap 212 in FIG. 2A. Unlike in the Rabi-driving case, where gate speeds must be much less than $1/f_{01}$ to avoid counter-rotating pollution of the operation, the gate speed for the disclosed non-adiabatic control is only limited to $1/f_{01}$. The quantum interference needed to achieve the gate operation is controlled by an interference phase that accrues during the gates. It can be tuned by either the amplitudes $A_1$ or $A_2$, by the duration in times $t_0$, $t_1$, or $t_2$, or a combination thereof. For example, in some embodiments, arbitrary control can be implemented with just the three parameters $t_0$, $A_0=A_1=A_2$, and $t_1=t_2$.

Figure 2B:
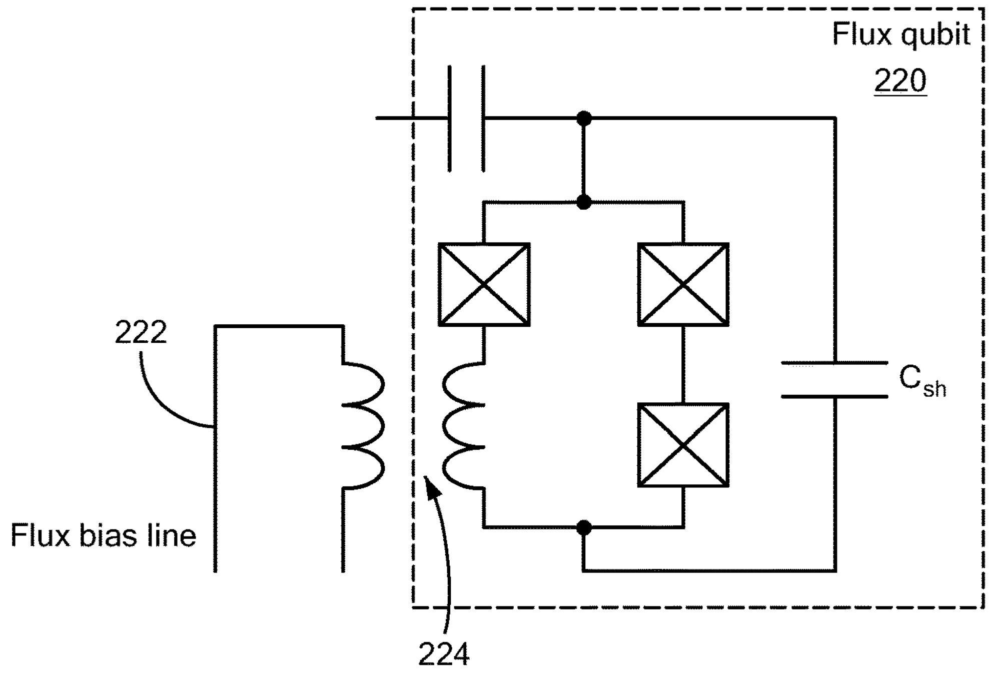
FIG. 2B is a circuit diagram of a flux qubit controllable using baseband pulsing, according to some embodiments.

The pulsed baseband waveform 210 may be realized as a baseband signal that is selectively applied to control a flux qubit, such as the flux qubit of FIG. 2B. In the example of FIG. 2A, waveform 210 may represent a current signal and, thus, $A_1$ and $A_2$ may correspond to current levels.

The advantages of the disclosed qubit control scheme include at least the following. First, this scheme may lead to better precision and lower susceptibility to instrumentation noise, since it is easier to precisely control the timing rather than the amplitude of the control pulses. In addition, the disclosed technique removes the need for costly, pulsed microwave sources, and it makes it possible control multiple qubits through a single control line (or a number of control lines less than the number of qubits being controlled) by using a network of switches. Next, the system has very low activity factor: only 3 amplitude settings need occur to realize this pulse scheme (off, positive, and negative). Also, the source of the signal may be either room temperature electronics, cryogenic (but not collocated electronics), or collocated electronics to the qubit. The low activity factor enables the use of collocated electronics, particular for low-power variants of SFQ logic, such us adiabatic quantum flux parametrons (AQFP). And embodiments enable the use of low-frequency "protected qubits" such as fluxonium or the 0-pi qubit, which have small gaps.

FIG. 2B shows an example of a flux qubit 220 that can be controlled using baseband pulsing, according to some embodiments. A pulse baseband waveform, such as waveform 210 of FIG. 2A, can be applied to a flux bias line 222 and, by way of inductive coupling 224, can cause the state of flux qubit 220 to rotate/change. In more detail, a signal applied to flux bias line 222 may, at selected times, be generated to include two approximately square baseband pulses of opposite current to cause the state of qubit 220 to change. At other times, the applied signal may have substantially zero current such that the current qubit state is maintained.

Figure 2C:
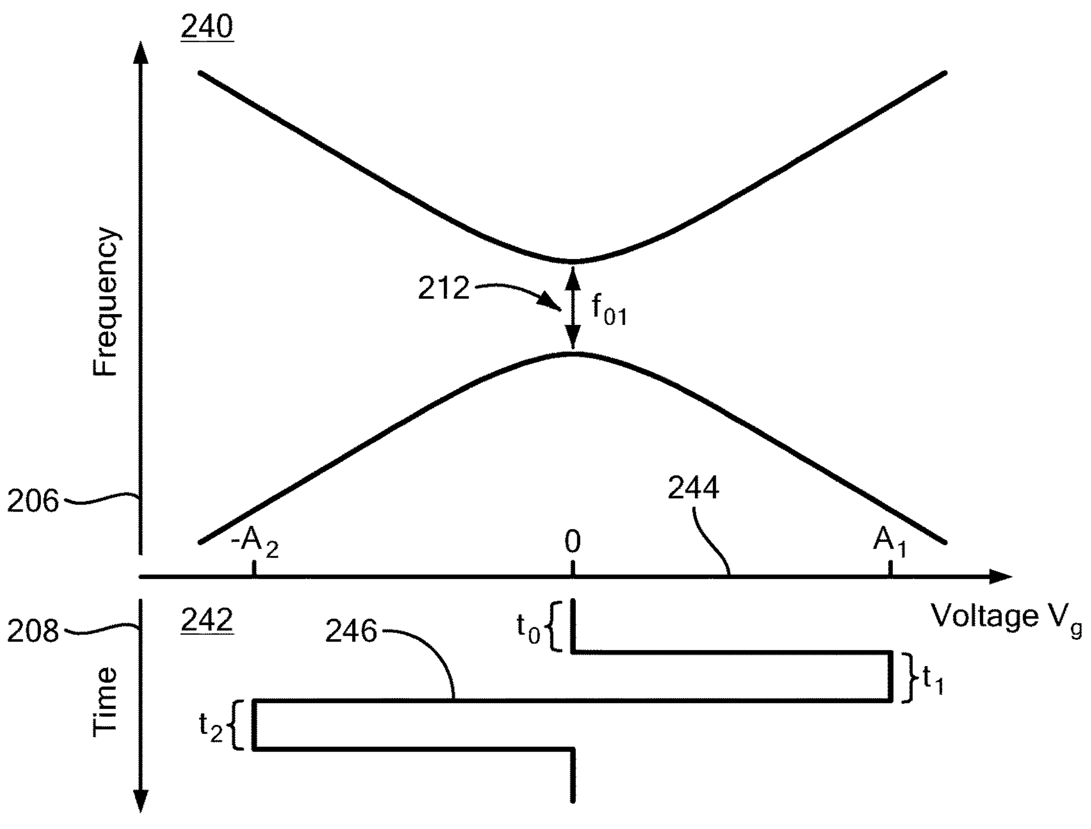
FIG. 2C shows a technique for controlling a charge qubit using baseband pulsing, according to embodiments of the present disclosure.

Turning to FIG. 2C, a pulsed baseband waveform can be generated as a voltage signal for controlling a charge qubit, according to some embodiments. Like elements of FIGS. 2A and 2C are showing using like reference numerals. A first plot 240 illustrates a qubit avoided crossing and a second plot 242 illustrates the pulsed baseband waveform. In this case, shared horizontal axis 244 represents charge or voltage. A waveform 246 may be generated as a baseband signal that is applied to control a charge qubit, such as the charge qubit of FIG. 2D. In the example of FIG. 2C, waveform 246 may be realized as a voltage signal and, thus, $A_1$ and $A_2$ may correspond to voltage levels.

Figure 2D:
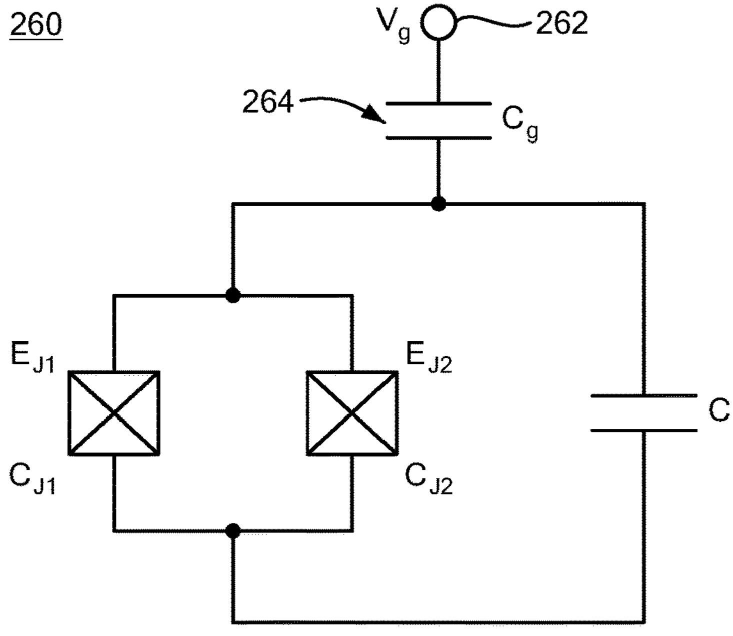
FIG. 2D is a circuit diagram of a charge qubit controllable using baseband pulsing, according to some embodiments.

FIG. 2D shows an example of a charge qubit 260 that can be controlled using baseband pulsing, according to some embodiments. A pulsed baseband waveform, such as waveform 246 of FIG. 2C, can be applied to a terminal 262 ($V_g$) that is coupled to the charge qubit via capacitor 264 ($C_g$), as shown, causing the state of charge qubit 260 to rotate/change. In more detail, a signal applied to terminal 262 may, at selected times, be generated to include two approximately square baseband pulses of opposite voltage to cause the state of qubit 260 to change. At other times, the applied signal may have substantially zero voltage such that the current qubit state is maintained.

Figure 3:
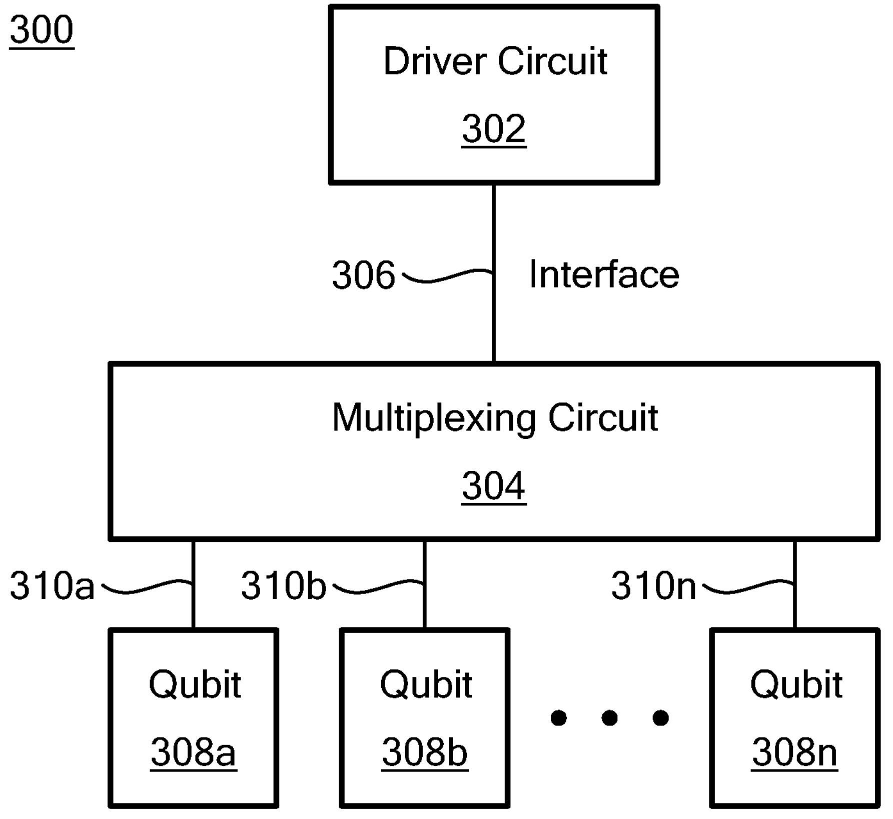
FIG. 3 is a block diagram of a quantum computing system having a plurality of qubits controllable using baseband pulsing, according to some embodiments.

FIG. 3 shows a quantum computing system having a plurality of qubits controlled using baseband pulsing, according to some embodiments. Illustrative system 300 includes a driver circuit 302 electrically coupled to a multiplexing circuit 304 via one or more interface lines 306 (e.g., wires), and a plurality of qubits 308*a*, 308*b*, . . . , 308*n* (308 generally) electrically coupled to multiplexing circuit 304 via respective ones of a plurality of control lines 310*a*, 310*b*, . . . , 310*n* (310 generally, e.g., wires or chip-level interconnects). Qubits 308 can generally be provided as any type of qubit featuring an avoided crossing, including but not limited to superconducting, semiconducting, and naturally occurring qubits. For example, one or more of the qubits 308 can be the same as or similar to the flux qubit of FIG. 2B or the charge qubit of FIG. 2D.

Driver circuit 302 is configured to generate a pulse signal that has a repeating pulsed baseband waveform similar to that illustrated in FIG. 2A or FIG. 2C. The pulses can correspond to changes in voltage or current, depending on the type of qubits 308. The generated pulse signal can be provided to multiplexing circuit 304 via one of the interface lines 306. In some embodiments, driver circuit 302 may include one or more switches controlled using a timing signal generated by a classical computer according to the parameters $t_0$, $t_1$, or $t_2$. In some embodiments, driver circuit 302 may include circuitry identical or similar to that described below in the context of FIG. 5. In some cases, driver circuit 302 may be collocated with qubits 308 as discussed further below in the context of FIG. 4A. In this case, driver circuit 302 may generate control pulses as charge/flux pulses that are selectively applied to individual or pairs of qubits 308 to control their state.

Multiplexing circuit 304 is configured receive the pulse signal from driver circuit 302 view one of the via interface lines 306 and, based thereon, to generate control signals on one or more of the plurality of control lines 310 to control the state of particular qubits 308. In more detail, to rotate the state of a particular qubit 308 (or pair of qubits) at a given time, multiplexing circuit 304 can cause the pulse signal to be passed from driver circuit 302 to that qubit/pair. At other times, multiplexing circuit 304 may apply zero current/voltage to that qubit/pair such that it maintains its current state. In some embodiments, multiplexing circuit 304 may comprise a plurality of switches connected to, and controllable by, one or more of the interface lines 306. In some embodiments, the switches arranged in a binary tree structure having N layers, with each layer connected to, and controllable by, one of the interface lines 306. In this arrangement, N interface lines 306 may be used to control $2^N$ of the qubits 308. In some embodiments, a single interface line 306 may be used to control multiple switching layers, or even all N switching layers. For example, an N-bit binary value may be communicated over single line/wire (e.g., using a digital serial protocol) to indicate which of the N layers of switches should be turned on/off. In some embodiments, a single interface line 306 may be used to control all of the N layers. In some cases, multiplexing circuit 304 can include circuitry identical or similar to that described below in the context of FIG. 6.

Figures 4A, 4B, 4C:
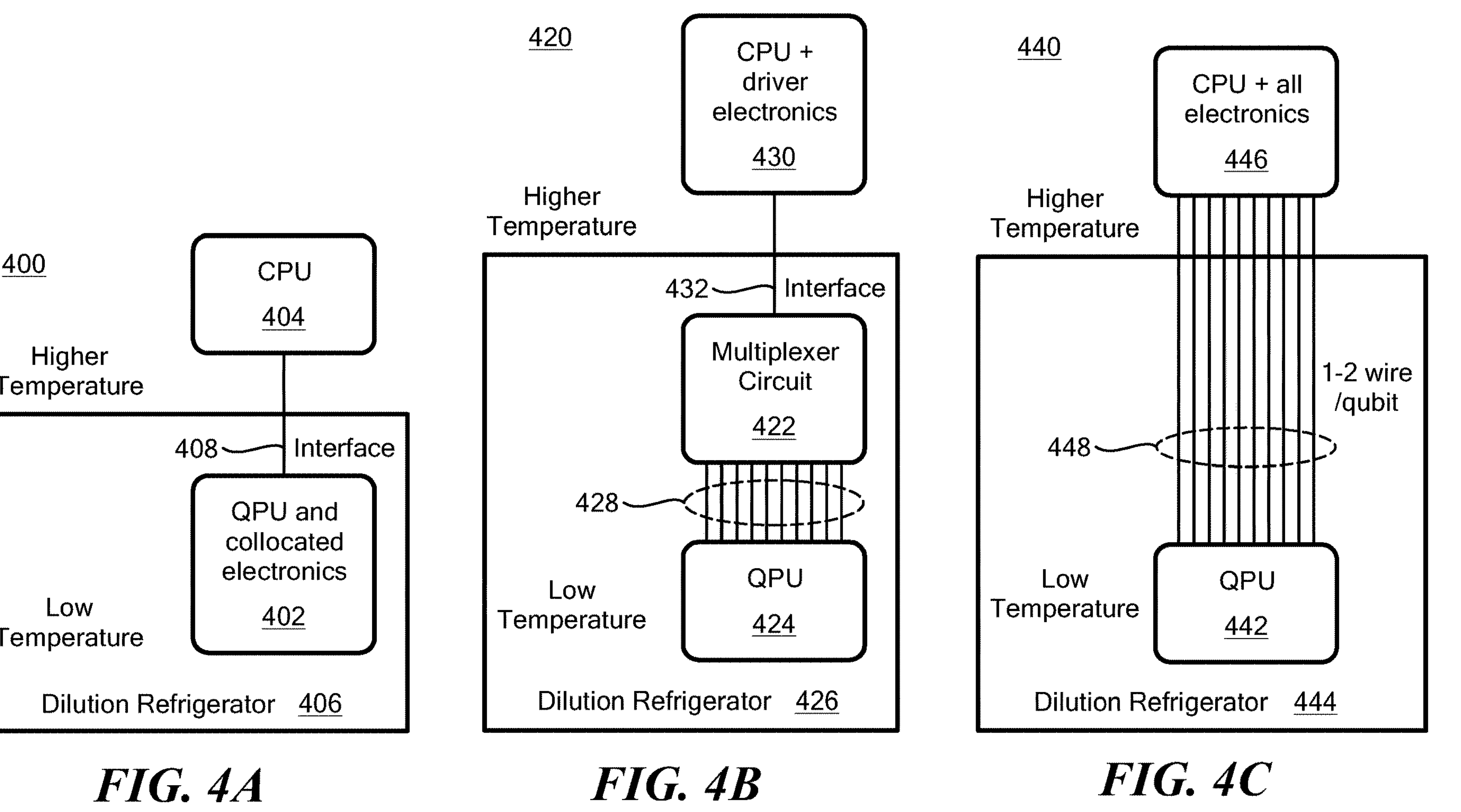
FIG. 4A is a block diagram of a quantum computing system in which control electronics are collocated with a quantum processing unit (QPU) at cryogenic temperature, according to some embodiments.
FIG. 4B is a block diagram of a quantum computing system in which a portion of the control electronics are at cryogenic temperature and another portion of the control electronics are at higher temperature, according to some embodiments.
FIG. 4C is a block diagram of a quantum computing system in which a QPU is at cryogenic temperature and control electronics are at higher temperature, according to some embodiments.

Various components of system 300 may be collocated (e.g., on a single chip or other type of integrated device) or physical separated. For example, driver circuit 302 and multiplexing circuit 304 may be collocated with qubits 308 (meaning that, in the case of superconducting qubits, circuits 302, 304 are maintained a cryogenic temperature, made possible the disclosed baseband pulsing schema). As another example, driver circuit 302 and/or multiplexing circuit 304 may be physical separate from qubits 308. FIGS. 4A-4C show possible implementations of system 300 and, more generally, implementations of the disclosed baseband pulsing control techniques.

In some embodiments, driver circuit 302 and/or multiplexing circuit 304 can be implemented using cryogenic CMOS or SFG technologies. For example, cryogenic CMOS may be used as the multiplexing or switching elements to implement the nonadiabatic control. This may be used in any of the modes listed above. This approach is particularly useful for qubit modalities where the nonadiabatic pulse is a shift in electric charge or voltage. Cryogenic CMOS may be used to generate the voltages (i.e., within driver circuit 302 to generate the pulse signal) or it may be used solely as a multiplexing switch (e.g., within multiplexing circuit 304). As another example, SFQ logic may be used to implement the disclosed electronics. In particular, the low-power variants of SFQ, such as adiabatic quantum flux parametrons (AQFP), may be used with ultra-low power dissipation. This is particularly relevant for qubit modalities where the nonadiabatic pulse implements a shift in magnetic flux or current. SFQ may be used to generate the magnetic field (e.g., using a flux DAC within driver circuit 302) or it may be used solely as the multiplexing switch (e.g., within multiplexing circuit 304).

One advantage to the disclosed qubit control scheme is that only three settings may be required (i.e., to, $A_0=A_1=A_2$, and $t_1=t_2$) and so the activity factor of active devices is much lower than for resonant driving schemes, which generally require not only deep logic, but also deep memory.

FIGS. 4A-4C show different embodiments of a quantum computing system in which the disclosed baseband pulse control techniques can be implemented. The systems include a first environment for being maintained at an ambient temperature, having a classical computing processor (denoted "CPU" in the figures), and a second environment for being maintained at a cryogenic temperature, having a quantum processing unit (QPU) with a plurality of qubits. Control electronics may be located entirely within the first environment, entirely within the second environment, or split between these environments using a hybrid approach. The CPU may be configured to execute one or more computer programs for programming/controlling qubits of the QPU by sending control/signals commands to a multiplexer.

FIG. 4A shows a quantum computing system in which control electronics are collocated with a quantum processing unit (QPU) at cryogenic temperature, according to some embodiments. Illustrative system 400 includes an integrated device 402 comprising control electronics collocated with a QPU having a plurality of qubits, such as qubits 308 of FIG. 3. The collocated control electronics can include, for example, driver circuit 302 and multiplexing circuit 304 of FIG. 3. Here, the driver circuit and/or multiplexing circuit may be implemented on chip using cryogenic CMOS or SFQ technologies. In some cases, driver circuit and/or multiplexing circuit may be bump bonded or wafer bonded to the plurality of qubits. Integrated device 402 can be maintained at cryogenic temperature within a dilution refrigerator 406. System 400 can also include a central processing unit (CPU) 404 located outside the dilution refrigerator 406 and connected to the integrated device 402 via one or more interface lines 408. Interface lines 408 may be the same as or similar to interface lines 306 of FIG. 3. In this embodiment, control lines 310 of FIG. 3 may be formed within integrated device 402, for example, using scalable chip-level interconnects.

FIG. 4B shows a hybrid implementation, wherein a portion of the control electronics are maintained at cryogenic temperature and another portion are at higher temperature (e.g., room temperature). Illustrative system 420 includes a multiplexing circuit 422 and a QPU 424 located within a dilution refrigerator 426 and connected together via a plurality of control lines 428. Here, multiplexing circuit 422 can be implemented on a chip (separate from QPU 424), using cryogenic CMOS or SFQ, for example. A driver circuit can be located outside the dilution refrigerator 426 along with CPU 430 and connected to multiplexing circuit 422 via one or more interface lines 432. In other embodiments, the driver circuit may be located within dilution refrigerator 426 but at higher temperature relative to multiplexing circuit 422 and/or QPU 424. In any case, interface lines 432 may include a line for carrying a pulse signal generated by driver electronics and one or more lines for carrying signals to control switches within multiplexing circuit 422. In some cases, a single interface line 432 may be used to control multiple switches or all switches of multiplexing circuit 422, as previously discussed.

FIG. 4C shows a quantum computing system in which a QPU is at cryogenic temperature and all control electronics are at higher temperature (e.g., room temperature). Illustrative system 440 includes QPU 442 located within dilution refrigerator 444 and electronics 446 located outside the dilution refrigerator 444 and connected to QPU 442 via a plurality of control lines 448 (e.g., one or more wires per qubit). Here, the generating of the pulse signal and multiplexing may be performed at higher temperature (e.g., room temperature). Control lines 448 can carry, at selected times, pulsed baseband control signals to individual or pairs of qubits within the QPU 442. This can be contrasted with existing systems where such per-qubit control lines (e.g., coaxial cables) are used to carry microwave pulses.

Figure 5:
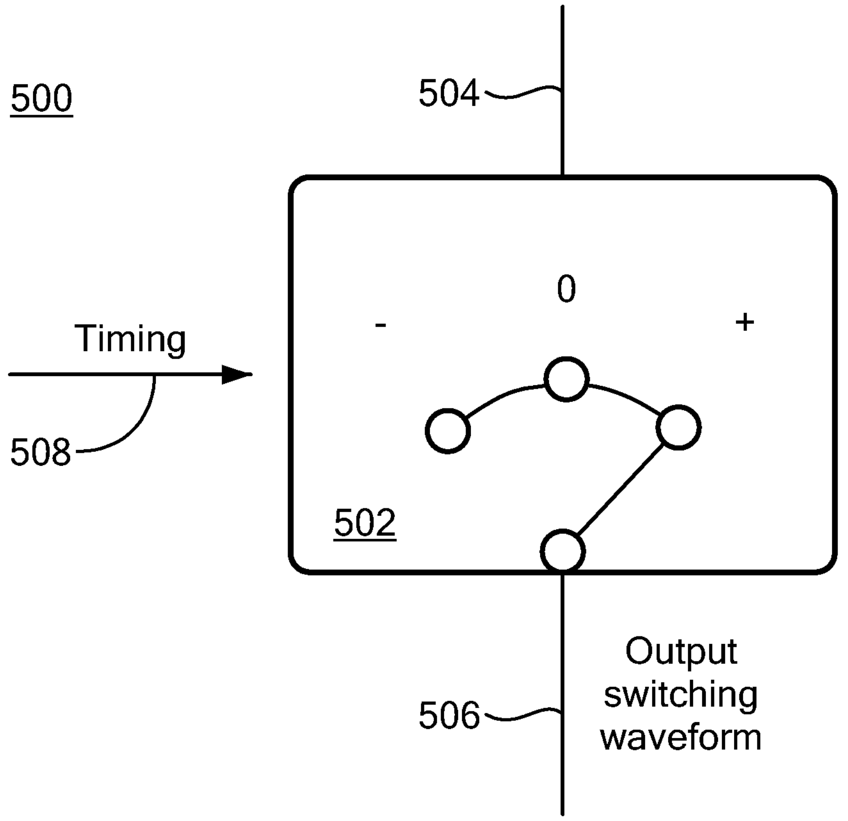
FIG. 5 is a circuit diagram showing illustrative circuitry that can be used to generate a pulsed baseband waveform, according to some embodiments.

FIG. 5 shows circuitry that can be used to generate a pulse signal comprising approximately square pulses, according to some embodiments. Illustrative circuit 500 includes a switching element 502 configured to receive a bias current/voltage 504 and to output a pulse signal (or "switching waveform") 506 responsive to the bias current/voltage 504 and to a timing signal 508. The bias current/voltage 504 and timing signal 508 may be generated externally (e.g., by a classical computer) according to the selected parameters $t_0$, $t_1$, $t_2$, $A_1$, and $A_2$. For example, in the case where $A_0=A_1=A_2$, the bias current/voltage 504 may be generated to have a fixed current/voltage $A_0$ and timing signal 508 may include ticks/pulses at intervals $t_0$, $t_1$, and $t_2$ causing switch to alternate between three states: off, positive, and negative. In the off state, switching element 502 outputs zero current/voltage. In the positive state, switching element 502 outputs $A_0$. In the negative state, switching element 502 outputs $-A_0$. Thus, a pulsed baseband waveform similar to that shown in FIG. 2A or 2C can be generated using circuit 500. Various other circuits and devices may be used to generate pulsed baseband waveforms according to the present disclosure.

Figure 6:
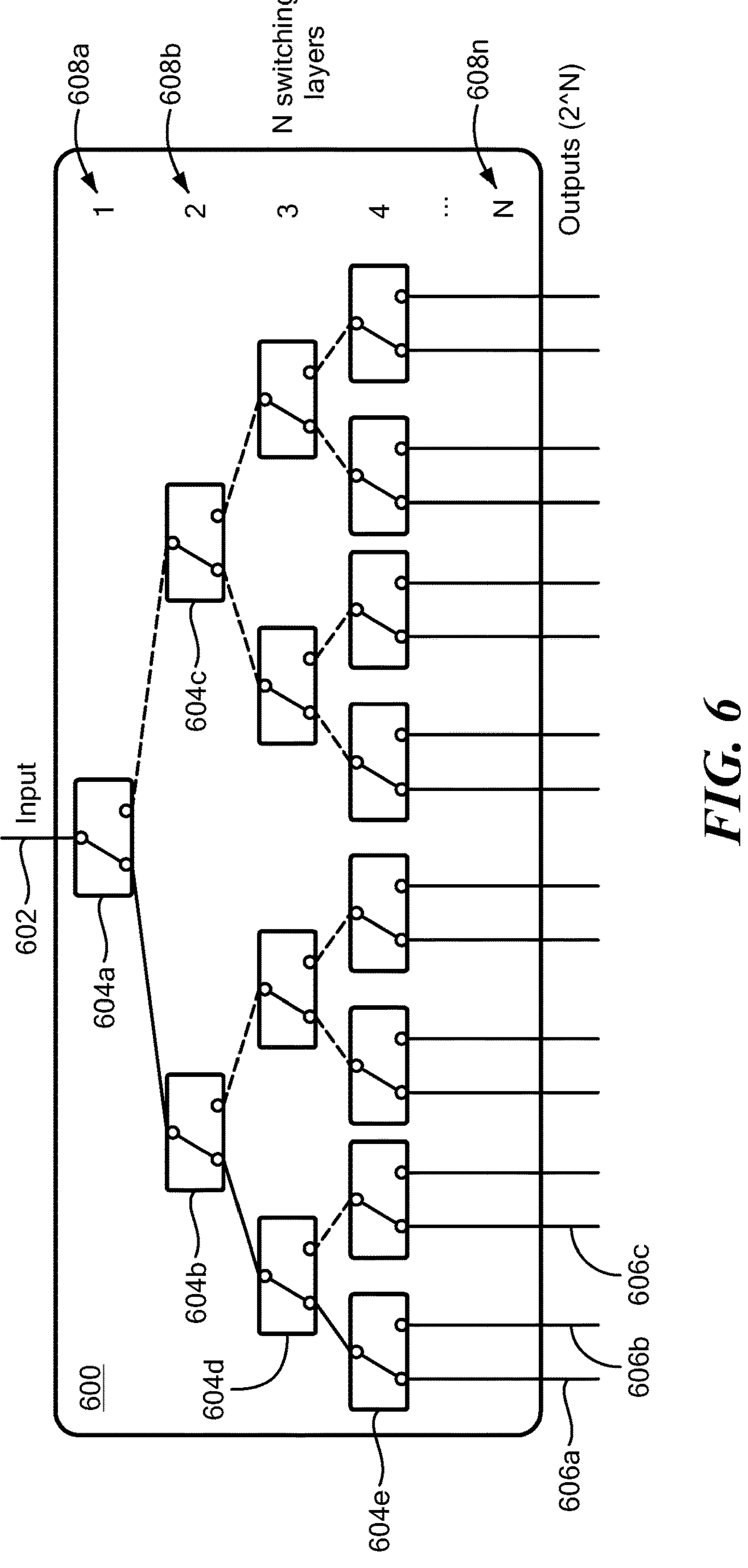
FIG. 6 is a circuit diagram showing an example of a multiplexing circuit that can be provided within embodiments of the present disclosure.

FIG. 6 shows an example of a multiplexing circuit that can be provided within embodiments of the present disclosure. Illustrative circuit 600 includes an input line 602, a plurality of switches 604*a*, 604*b*, 604*c*, etc. (604 generally), and a plurality of outputs lines 606*a*, 606*b*, 606*c*, etc. (606 generally). Switches 604 may be arranged in a binary tree structure having N layers 608*a*, 608*b*, . . . , 608*n* (608 generally), as shown. In this arrangement, circuit 600 can provide $2^N$ separate output lines 606, each of which can be connected to an individual qubit or pair of qubits.

All switches in a given layer 608 may be controlled using a common switch control signal applied via a common control line. For example, switch 604*a* in layer 608*a* may be connected to one control line, whereas both switches 604*b*, 604*c* in layer 608*b* may be connected to different control line. In some embodiments, these control lines may correspond to separate interface lines (e.g., separate interface lines 432 of FIG. 4B). In other embodiments, multiplexing circuit 600 may use a single interface line to control multiple layers 608 of switches or even all layers of switches. For example, circuit 600 may include digital circuitry to convert N-bit binary values received via a single interface line (e.g., using a digital serial protocol) into N control signals applied to respective ones of the N layers 608 of switches.

In operation, a pulse signal (i.e., a current/voltage signal having a pulsed baseband waveform disclosed herein) can be applied to input line 602 and switches 604 can be controlled to selectively output the pulse signal on a particular one of the output lines 606 (while outputting zero current/voltage on other output lines). For example, to control a qubit connected to first output line 606*a*, switches 604*a*, 604*b*, 604*d*, and 604*e* may be switched an "on" position. As shown, this routes the pulse signal from input 602 to first output line 606*a*.

Various other circuits and devices may be used to route a pulse signal to particular ones of a plurality of qubits. For clarity, not all switches and output lines are labeled in FIG. 6. Also not shown are the per-layer switch control lines.

As used herein, the terms "processor" and "controller" are used to describe electronic circuitry that performs a function, an operation, or a sequence of operations. The function, operation, or sequence of operations can be hard coded into the electronic circuit or soft coded by way of instructions held in a memory device. The function, operation, or sequence of operations can be performed using digital values or using analog signals. In some embodiments, the processor or controller can be embodied in an application specific integrated circuit (ASIC), which can be an analog ASIC or a digital ASIC, in a microprocessor with associated program memory and/or in a discrete electronic circuit, which can be analog or digital. A processor or controller can contain internal processors or modules that perform portions of the function, operation, or sequence of operations. Similarly, a module can contain internal processors or internal modules that perform portions of the function, operation, or sequence of operations of the module.

As used herein, the term "predetermined," when referring to a value or signal, is used to refer to a value or signal that is set, or fixed, in the factory at the time of manufacture, or by external means, e.g., programming, thereafter. As used herein, the term "determined," when referring to a value or signal, is used to refer to a value or signal that is identified by a circuit during operation, after manufacture.

As used herein, the terms "processor" and "controller" are used to describe electronic circuitry that performs a function, an operation, or a sequence of operations. The function, operation, or sequence of operations can be hard coded into the electronic circuit or soft coded by way of instructions held in a memory device. The function, operation, or sequence of operations can be performed using digital values or using analog signals. In some embodiments, the processor or controller can be embodied in an application specific integrated circuit (ASIC), which can be an analog ASIC or a digital ASIC, in a microprocessor with associated program memory and/or in a discrete electronic circuit, which can be analog or digital. A processor or controller can contain internal processors or modules that perform portions of the function, operation, or sequence of operations. Similarly, a module can contain internal processors or internal modules that perform portions of the function, operation, or sequence of operations of the module.

As used herein, the term "predetermined," when referring to a value or signal, is used to refer to a value or signal that is set, or fixed, in the factory at the time of manufacture, or by external means, e.g., programming, thereafter. As used herein, the term "determined," when referring to a value or signal, is used to refer to a value or signal that is identified by a circuit during operation, after manufacture.

While electronic circuits shown in figures herein may be shown in the form of analog blocks or digital blocks, it will be understood that the analog blocks can be replaced by digital blocks that perform the same or similar functions and the digital blocks can be replaced by analog blocks that perform the same or similar functions. Analog-to-digital or digital-to-analog conversions may not be explicitly shown in the figures but should be understood.

In the foregoing detailed description, various features are grouped together in one or more individual embodiments for the purpose of streamlining the disclosure. This method of disclosure is not to be interpreted as reflecting an intention that each claim requires more features than are expressly recited therein. Rather, inventive aspects may lie in less than all features of each disclosed embodiment.

References in the disclosure to "one embodiment," "an embodiment," "some embodiments," or variants of such phrases indicate that the embodiment(s) described can include a particular feature, structure, or characteristic, but every embodiment can include the particular feature, structure, or characteristic. Moreover, such phrases are not necessarily referring to the same embodiment(s). Further, when a particular feature, structure, or characteristic is described in connection knowledge of one skilled in the art to affect such feature, structure, or characteristic in connection with other embodiments whether or not explicitly described.

As used herein, "including" means including without limitation. As used herein, the terms "a" and "an", when modifying a noun, do not imply that only one of the noun exists. As used herein, unless the context clearly indicates otherwise, "or" means and/or. For example, A or B is true if A is true, or B is true, or both A and B are true. As used herein, "for example", "for instance", "e.g.", and "such as" refer to non-limiting examples that are not exclusive examples. The word "consists" (and variants thereof) are to be give the same meaning as the word "comprises" or "includes" (or variants thereof).

Use of ordinal terms such as "first," "second," "third," etc., in the specification to modify an element does not by itself connote any priority, precedence, or order of one element over another or the temporal order in which acts of a method are performed, but are used merely as labels to distinguish one element having a certain name from another element having a same name (but for use of the ordinal term) to distinguish the elements.

The disclosed subject matter is not limited in its application to the details of construction and to the arrangements of the components set forth in the following description or illustrated in the drawings. The disclosed subject matter is capable of other embodiments and of being practiced and carried out in various ways. As such, those skilled in the art will appreciate that the conception, upon which this disclosure is based, may readily be utilized as a basis for the designing of other structures, methods, and systems for carrying out the several purposes of the disclosed subject matter. Therefore, the claims should be regarded as including such equivalent constructions insofar as they do not depart from the spirit and scope of the disclosed subject matter.

Although the disclosed subject matter has been described and illustrated in the foregoing exemplary embodiments, it is understood that the present disclosure has been made only by way of example, and that numerous changes in the details of implementation of the disclosed subject matter may be made without departing from the spirit and scope of the disclosed subject matter.

All publications and references cited herein are expressly incorporated herein by reference in their entirety.

The invention claimed is:

1. A system for performing quantum computations, the system comprising:

a first environment for being maintained at an ambient temperature, having a classical computing processor; and a second environment for being maintained at a cryogenic temperature, having a plurality of qubits and a multiplexing circuit coupled to the plurality of qubits, each of the plurality of qubits having a respective gap transition frequency, wherein the classical computing processor is configured to change a state of particular ones of the of the plurality of qubits by controlling the multiplexing circuit to couple the particular ones of the plurality of qubits to a pulsed baseband waveform, wherein the pulsed baseband waveform comprises a non-adiabatic waveform that is not resonant with respect to the respective gap transition frequencies of the particular ones of the plurality of qubits.

2. The system of claim 1, wherein the multiplexing circuit comprises a plurality of switches arranged in a binary tree structure.

3. The system of claim 1, wherein the pulsed baseband waveform comprises a first pulse having a first duration and a positive amplitude, and a second pulse having a second duration and a negative amplitude.

4. The system of claim 3, wherein the first pulse, the second pulse, or both are square pulses.

5. The system of claim 1, further comprising a driver circuit to generate the pulsed baseband waveform.

6. The system of claim 5, wherein the driver circuit is located within the first environment for being maintained at the ambient temperature.

7. The system of claim 5, wherein the driver circuit is located within the second environment for being maintained at the cryogenic temperature.

8. The system of claim 7, wherein the driver circuit is implemented using cryogenic CMOS or single-flux quantum (SFQ) logic.

9. The system of claim 1, wherein the multiplexer circuit is located within the second environment for being maintained at the cryogenic temperature.

10. The system of claim 9, wherein the multiplexer circuit is implemented using cryogenic CMOS or single-flux quantum (SFQ) logic.

11. The system of claim 9, wherein the multiplexer circuit is collocated on a same chip as one or more of the plurality of qubits.

12. The system of claim 1, wherein the multiplexer circuit is bump bonded or wafer bonded to the plurality of qubits.

13. The system of claim 1, wherein the multiplexer circuit is connected to each of the plurality of qubits via chip-level interconnects.

14. A quantum computing system comprising:

a classical computing processor;

a quantum processing unit (QPU) having a plurality of qubits with respective gap transition frequencies; and a multiplexer configured to couple particular ones of the plurality of qubits to a pulsed baseband waveform responsive to commands received from the classical computing processor, wherein the pulsed baseband waveform comprises a non-adiabatic waveform that is not resonant with respect to the respective gap transition frequencies of the particular ones of the plurality of qubits.

15. The quantum computing system of claim 14, wherein the pulsed baseband waveform comprises a first pulse having a first duration and a positive amplitude, and a second pulse having a second duration and a negative amplitude.

16. The quantum computing system of claim 15, wherein the first pulse, the second pulse, or both are square pulses.

17. The quantum computing system of claim 14, wherein the classical computing processor is maintained at an ambient temperature, and both the QPU and the multiplexer are maintained at a cryogenic temperature.

18. The quantum computing system of claim 14, further comprising a driver to generate the pulsed baseband waveform.

19. The quantum computing system of claim 14, wherein the multiplexer is collocated on a same chip as one or more of the plurality of qubits.

* * * * *